INVENTORS
JOHN H. COOGAN
RICHARD KLEIN

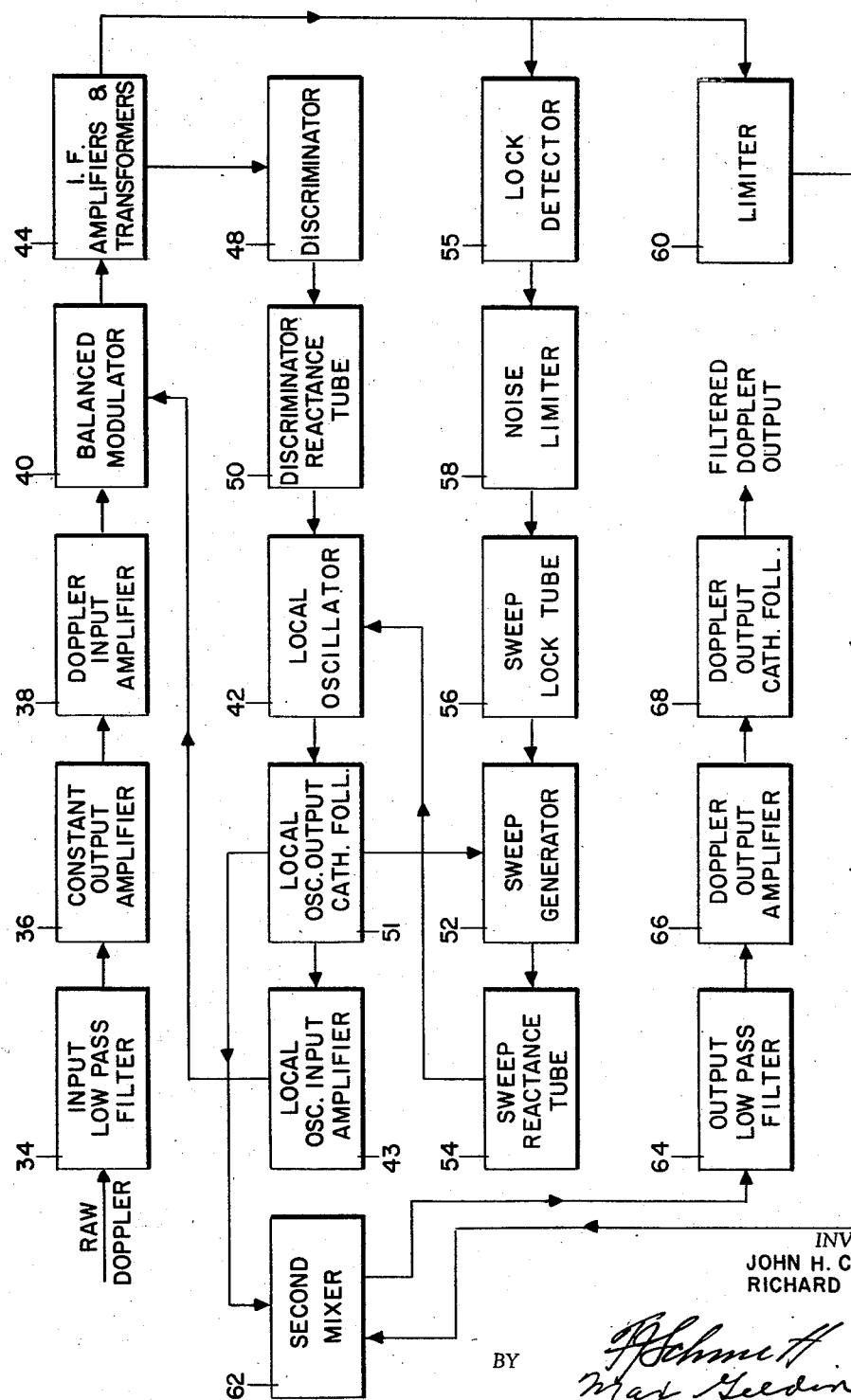

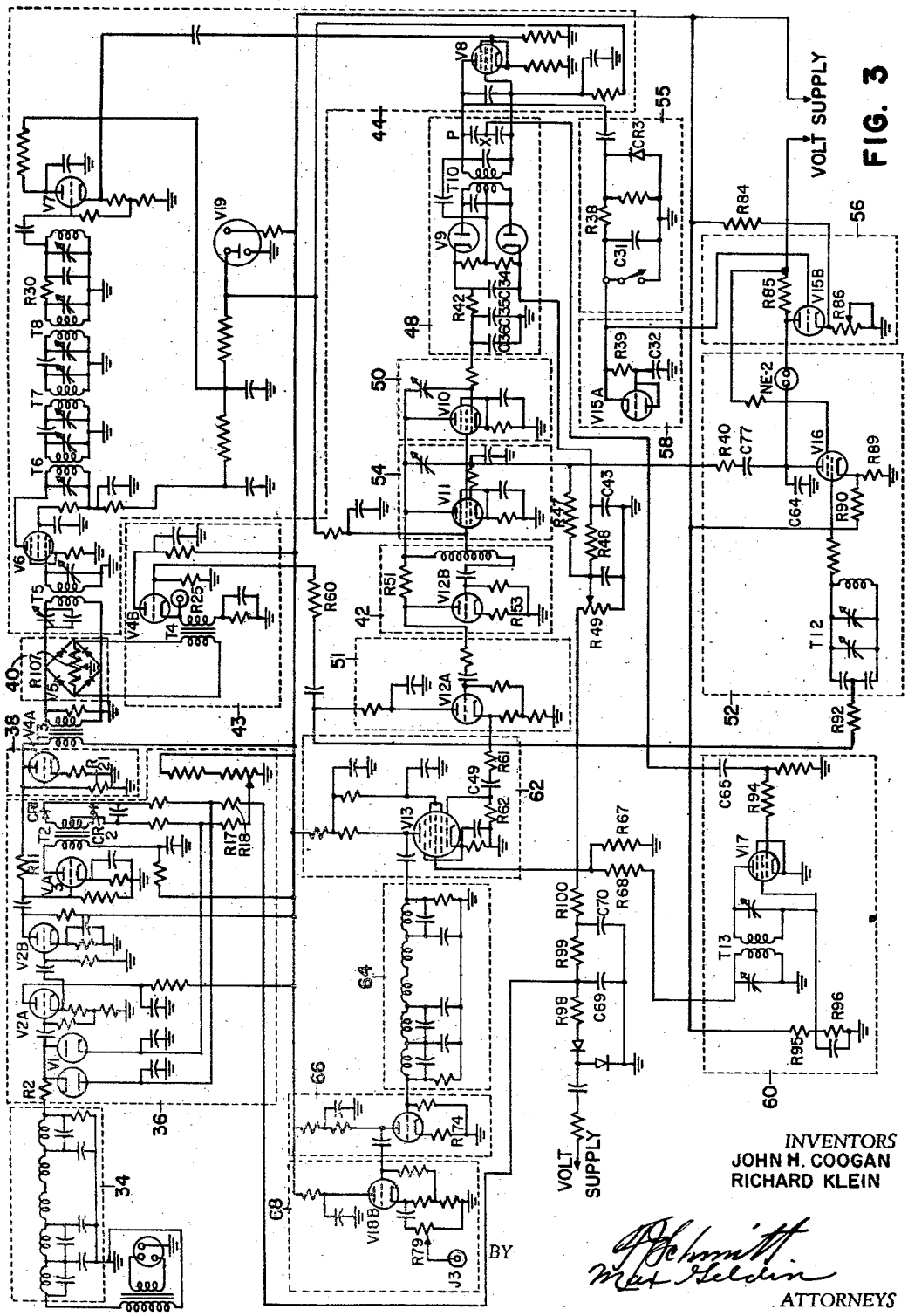

United States Patent Office 2,891,245
Patented June 16, 1959

2,891,245
SIGNAL TRACKING DEVICE

John H. Coogan, Oxnard, and Richard Klein, Arcadia, Calif., assignors to the United States of America as represented by the Secretary of the Navy Application November 2, 1953, Serial No. 389,901

4 Claims. (Cl. 343—8)

(Granted under Title 35, U.S. Code (1952), sec. 266)

The invention described herein may be manufactured and used by or for the Government of the United States of America for governmental purposes without the payment of any royalties thereon or therefor.

This invention relates to electrical signal tracking devices, and is particularly concerned with selective filter devices for tracking audio signals, especially Doppler frequencies.

A velocimeter is a continuous wave radar device which emits continuous wave audio signals known as Doppler signals. Such device may be employed for determining the velocity of an aircraft or guided missile in flight. The velocimeter includes a transmitter and receiver, and the difference frequency between the originally transmitted signal and the signal received following its reflection from the craft or missile is known as a "Doppler" signal, and is in the audio frequency range. From this Doppler information the velocity of the craft can be established.

Some filter means is generally employed to increase the signal-to-noise ratio of the Doppler and improve the range of the system. In filters now generally employed for this purpose the filter must be preset to lock on the Doppler as it passes through a certain frequency. The disadvantage of this is the inability of the filter to recapture the signal after a momentary loss thereof such as by fading.

One object of the invention is the provision of a signal tracking device, particularly adapted for the tracking of audio signals such as Doppler signals.

Another object is to provide a selective filter device which effectively increases the signal-to-noise ratio of an audio signal such as a Doppler signal and increases the range thereof.

A particular object of the invention is the provision of a selective filter device or circuit for audio signals, especially Doppler, having a structure which searches through a preselected frequency spectrum for such signals, and on encountering a signal within this frequency range inactivates the search mechanism and tracks the signal through any frequency changes within the aforementioned range.

Yet another aim of the invention is to provide a selective filter device involving comparatively simple yet reliable circuitry.

Other objects and many of the attendant advantages of this invention will be readily appreciated as the same becomes better understood by reference to the following detailed description when considered in connection with the accompanying drawings wherein:

Fig. 2 is a schematic circuit diagram in block form of a second embodiment of the selective filter device of the invention; and Fig. 3 is a schematic circuit diagram of the filter device of Fig. 2 wherein the individual circuits of the component parts are shown diagrammatically in detail.

Figure 1:
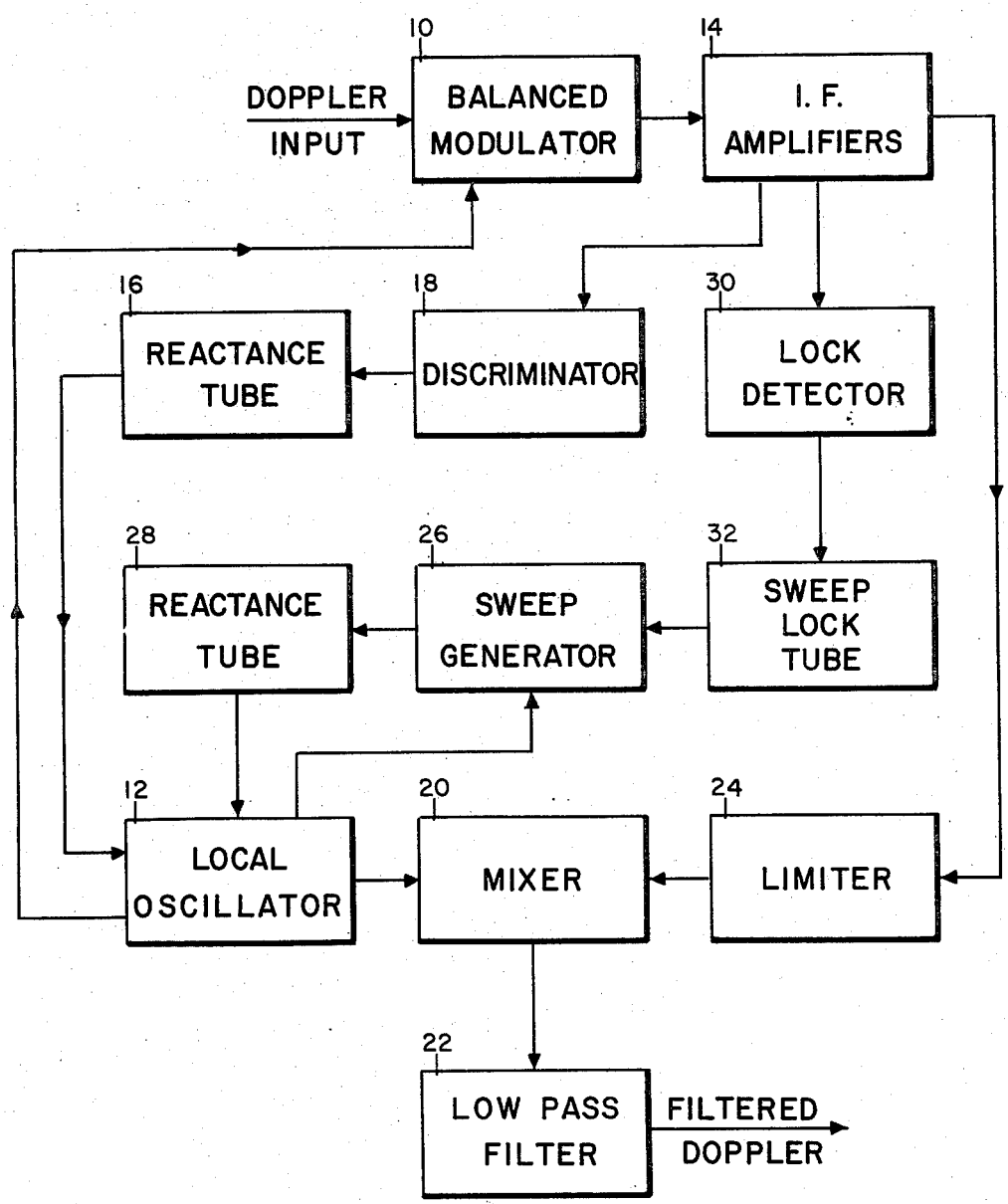
Fig. 1 is a schematic circuit diagram in block form of one embodiment of a signal tracking or selective filter device according to the invention.

Generally, the invention device comprises a combination of circuit components, described in detail hereinafter, enabling the device, in the absence of a signal within a preselected frequency range, to search or sweep through this spectrum for such signal and, upon encountering same, to inactivate the search means and permit other components of the circuit to thereafter track the signal through the device regardless of any changes in the signal frequency within the aforementioned range. The invention device constitutes a narrow band selective filter operating in the preselected frequency spectrum and having its circuit elements so arranged and combined that when a signal within the desired range is received and the search means rendered inoperative as aforesaid, the center frequency of its pass band becomes locked to this signal and follows it through any frequency changes within such range. In this manner the effective bandwidth of the signal is reduced and consequently the effective range thereof is increased.

In Fig. 1 showing schematically one form of the invention, it is desired to increase the signal-to-noise ratio and the range of, for example, a raw Doppler within the frequency range 1–30 kc. The Doppler is applied to a balanced modulator 10 which is also fed by signals from a local oscillator 12. The balanced modulator is designed to suppress the local oscillator content of its output, and the difference frequency is accepted by the I.F. (intermediate frequency) amplifiers or I.F. strip 14. The frequency of the local oscillator is controlled by a reactance tube 16 whose grid is fed by the D.C. output voltage of a discriminator 18 fed by the I.F. strip. In a manner similar to that of an automatic frequency control system, the local oscillator frequency is changed so as to compensate for either local oscillator drift or change in the input Doppler frequency, and to maintain substantially constant, i.e. within close limits, the difference frequency output of the balanced modulator, which in this instance is about 100 kc. The 100 kc. I.F. is then mixed in mixer 20 with the local oscillator signal and the resulting signal is fed through low pass filter 22, e.g. one having a cutoff frequency of 30 kc., leaving only the original Doppler frequency, now filtered. A limiter stage 24 is provided for the I.F. signal prior to mixing thereof with the local oscillator signal, to eliminate a substantial portion of the low frequency amplitude noise usually present. This is one feature of the instant invention.

It is noted that with a changing Doppler frequency input, the I.F. frequency must vary somewhat from 100 kc. in order that an error voltage be realized from the discriminator; this, however, gives no frequency error in the filtered Doppler output of the invention device, which is the difference between the local oscillator and I.F. frequencies. For example, if the Doppler input frequency changes from 15 kc. to 20 kc., the local oscillator moves from 115 kc. to 120 kc. minus about 30 c.p.s. because the frequency into the discriminator must be about 30 c.p.s. off of its resonant frequency in order to give sufficient error voltage to move the local oscillator 4,970 c.p.s. This means that the frequency present in the I.F. strip and applied to the discriminator is now 99.97 kc. When this 99.97 kc. signal is mixed with the local oscillator frequency of 119.97 kc., the difference frequency output (the filtered Doppler) is 119.97 kc. minus 99.97 kc., or exactly 20 kc., and no error exists.

The quiescent local oscillator frequency (frequency with zero error voltage applied to the reactance tube) is set at 115 kc. in the foregoing example; hence with 15 kc. Doppler input frequency, the I.F. frequency will be exactly 100 kc. This is why in the example noted above, 15 kc. was chosen as the starting Doppler frequency, but it should be clear that whatever Doppler frequency is inserted will be presented unchanged at the output.

Now considering the important search and lock features of the invention, these circuits are incorporated for the purpose of (1) causing the invention device to periodically sweep a predetermined frequency spectrum (approximately 1 to 30 kc. in this particular example) in search of a signal, and (2) upon encountering the signal, stopping the sweep and allowing the discriminator to control the local oscillator frequency as previously described.

The sweep is accomplished by coupling the output of a sawtooth voltage or sweep generator 26 to the grid of a second reactance tube 28 which controls the local oscillator frequency, a portion of the local oscillator output being fed back to the sweep generator. The frequency of sweep of the sawtooth voltage generator in the case at hand may be about 4 c.p.s. in the absence of noise, and somewhat lower in noisy operation, the actual frequency depending upon the noise level present in the hereinafter described lock circuit. The voltage variations produced by the sweep of the sawtooth generator in turn, through reactance tube 28, cause the local oscillator 12 to sweep through the desired frequency spectrum in search of a signal.

When a signal is present at the input to the balanced modulator, as the local oscillator sweeps to a frequency 100 kc. above the input signal frequency, I.F. output will be developed. This I.F. is rectified in a lock detector 30 and applied to the grid of a sweep lock tube (triode) 32 arranged to remove the plate voltage of the sawtooth generator in a manner more fully pointed out hereinafter, and thus stop the sweep thereof. This rectified I.F. voltage will continue to keep the sweep shut off, i.e. maintain the sawtooth voltage generator inactivated, as long as the signal is present, and locked system operation will prevail. If and when the Doppler input signal becomes lost and no I.F. is produced, the sawtooth generator will again commence its voltage sweep operation, causing the local oscillator to sweep the desired frequency spectrum in search of the Doppler.

A detailed circuit description of a specific embodiment of the invention follows below, in connection with the block and circuit diagrams of Figs. 2 and 3 of the drawing.

According to this embodiment, a raw Doppler input signal in the frequency range 1 to 30 kc. is first fed to a low pass input filter 34. This is a conventional m-derived filter consisting of a protoype section, intermediate pi-sections and two terminating sections. The filter is designed for a cutoff frequency of 30 kc. and a characteristic impedance of 10,000 ohms. Its purpose is to exclude all noise above 30 kc. from the input Doppler signal.

The output of filter 34 is connected to a constant output amplifier circuit 36. This circuit, comprising a dual diode V1, cathode follower V2A and amplifier tubes V2B and V3A, is a very effective automatic volume control unit and presents essentially a constant voltage at the grid of tube V4A of a Doppler input amplifier 38 for any input voltage over 0.2 volt R.M.S. It is necessary that the voltage into V4A be constant since the size of this signal directly affects the gain of the automatic frequency control system.

The automatic volume control action is accomplished by a voltage divider network having an arm which is variable electronically. The size of the input signal present on the grid of V2A is determined by the voltage divider formed by resistance R2 and the dual diode V1. At zero signal level, the fixed bias furnished by resistances R17 and R18 holds the diodes in a non-conducting state. Under this condition, a very weak signal would be impressed on the grid of V2A without attenuation. As the input signal is increased, it is amplified by V2B and V3A, rectified and filtered by the crystal diodes CR1 and CR2 and network connected to transformer T2, and used to oppose the fixed bias applied to the dual diode. As the bias on the diodes decreases, the plate resistance will decrease and the voltage division will change. The bridge arrangement of the diodes prevents second harmonic distortion and phase shift; however, to realize this condition, the two fixed biases must be equal and of opposite polarity. The purpose of the cathode follower V2A is to provide a lower input capacity so that on very noisy signals, when the bias is determined primarily by noise, the frequency response of R2 and the shunt input capacities to the small signal component present will not impair tracking out to high frequencies.

The filament voltage for dual diode V1 is maintained at +90 volts D.C. with respect to chassis ground to avoid heat-cathode leakage and consequent introduction of hum into the signal at this point.

The balanced modulator circuit or first mixer 40 is a special mixing circuit designed to suppress the local oscillator content of its output and is necessary since the local oscillator 42 sweeps to within 1 kc. of the approximately 100 kc. I.F. Both sides of the modulator V5 are fed by transformers T3 and T4, the Doppler input transformer T3 being driven by amplifier V4A while the local oscillator transformer T4 is driven by local oscillator amplifier 43 comprising a cathode follower V4B in order to pass the 101 to 130 kc. local oscillator signal. The amplitudes of the two signals are set by voltage dividers R11—R21 and R60—R25. Potentiometer R107 is a chassis control used to balance out the local oscillator output of the modulator and is adjusted for minimum signal out of the I.F. strip with 100 kc. fed into the local oscillator cathode follower V12A.

The difference frequency component of the balanced modulator output is picked out by a selective I.F. strip 44 having a narrow bandwidth of about 750 c.p.s., and comprising amplifier tubes V6 and V8, cathode follower V7, transformer T5 and transformers T6, T7 and T8 between amplifier V6 and cathode follower V7. The input transformer T5 has its primary connected in series resonance to match the low output impedance of the balanced modulator and to avoid loading the resonant circuit. The secondary of T5 drives the grid of the first I.F. amplifier V6 which has cathode degeneration for stability. Three medium Q I.F. transformers T6, T7 and T8 are used to give steep skirts to the selectivity curve, and one high Q resonant circuit 46 provides the 750 c.p.s. 3 db bandwidth. In order to avoid loading this high Q, high impedance circuit, it is isolated by a high resistance R30, and drives the high input impedance cathode follower V7. The output of V7 is capacity-coupled to the last I.F. amplifier V8. The plate and screen supply for the I.F. tubes V6, V7 and V8 is dropped to 150 volts and isolated from the other circuits by voltage regulator V19. Decoupling networks prevent any interaction within the I.F. strip itself.

Amplifier V8 drives a conventional Foster-Seeley discriminator circuit 48 made up of transformer T10 and dual diode V9. Capacitor C34 filters out most of the 100 kc. I.F., while resistor R42 and capacitors C35 and C36 complete that operation and also act as noise filters.

The filtered D.C. output of the discriminator is applied to the grid of discriminator reactance tube 50 (V10) which is direct-coupled to the local oscillator 42 comprising tube V12B. Unbypassed cathode resistor R53 and plate resistor R51 are used to improve the waveform of the oscillator signal. Local oscillator output is capacity-coupled to a cathode follower 51 (V12A) for distribution to the balanced modulator 40, and to the second mixer and sweep generator, both discussed below.

The quiescent frequency of the local oscillator, i.e. the local oscillator frequency with zero error voltage from the discriminator 48 and no sweep voltage applied, is set by the bias on reactance tube V10 and on a second reactance tube V11, further mentioned below. The bias is controlled by chassis potentiometer R49. The quiescent frequency used here is 115 kc., the center of the local oscillator sweep range. Resistor R48 and capacitor C43 provide isolation and further filtering of the bias voltage.

A sawtooth voltage is developed by a sweep generator or relaxation oscillator 52 comprising thyratron tube V16 which is capacity-coupled to sweep reactance tube 54 (V11), which in turn is direct-coupled to the local oscillator in parallel with the discriminator reactance tube V10.

The free-running frequency of sweep generator tube V16 is set by resistor R85 and capacitor C64 and the cathode bias voltage divider R89 and R90, while the actual operating frequency of the sweep generator is somewhat modified due to the firing arrangement of thyratron V16 using resonant circuit T12. The polarity of the sweep voltage applied to sweep reactance tube V11 is such that the local oscillator sweeps down from about 130 kc. to 101 kc. Local oscillator voltage is applied through resistor R92 to resonant circuit T12 which is tuned to a frequency sufficiently lower than 101 kc. so that as the frequency of the voltage applied to this resonant circuit sweeps down to 101 kc., the resonant rise gives enough voltage on the grid of thyraton V16 to fire it. This allows a convenient method of setting the lower limit (101 kc.) of oscillator sweep, which is important since it is undesirable to have the local oscillator sweep through the I.F. frequency (about 100 kc.).

As the local oscillator sweeps from 130 to 101 kc. while a Doppler signal is present, I.F. voltage will be developed at the time the local oscillator is 100 kc. above this Doppler signal. The rising I.F. voltage is capacity-coupled from point P on the primary of discriminator transformer T10, rectified by lock detector 55 in the form of a crystal diode (CR3) and filtered by resistor R38 and capacitor C31. This positive lock voltage is then applied to the grid of sweep lock tube 56 (V15B), normally cut off by the cathode bias developed by resistors R84 and R86, causing it to conduct and drop its plate voltage to a very low value. The drop in voltage at the plate of V15B causes neon tube NE-2 to extinguish and, since the thyratron is accordingly not fired, condenser C64 can discharge only through the high resistance coupling network comprising condenser C77 and resistors R40, R47 and R49. In this manner, the sweep of the local oscillator is stopped and the frequency thereof is maintained close to the lock frequency corresponding to the Doppler picked up until the discriminator reactance tube V10 takes control.

If a comparatively noisy signal is present at the input, the I.F. signal at discriminator transformer T10 will also tend to be noisy (though improved over the input signal), as will the rectified lock voltage. R38 and C31 filter this D.C. voltage considerably. However, on a very noisy signal, the negative noise spikes tend to unlock the sweep of the sawtooth generator, causing the thyratron thereof to conduct; hence, noise limiter circuit 58 is used to prevent such action. This circuit comprises a diode V15A, which is maintained at the positive D.C. lock voltage by condenser C32 charging through resistance R39. Any negative pulses appearing at its cathode will cause V15A to conduct, the pulse being shorted to ground through C32.

If pure noise only is present at the input as the local oscillator sweeps through its frequency range, the 100 kc. output of the balanced modulator will be present due to the audio frequency components of the noise. If the lock sensitivity of sweep lock tube V15B is too high, the rectified I.F. voltage will be sufficient to cause a lock. Control of the lock sensitivity is accordingly provided by potentiometer R86 to allow proper operation of the filter device hereof for any noise level at the input. This potentiometer sets the cathode bias on the sweep lock tube and determines the magnitude of lock voltage necessary to stop the sweep of the sawtooth generator 52.

In order to regain the original Doppler signal, the I.F. signal must be mixed with the local oscillator output and the difference frequency separated out. Before the I.F. is mixed, its signal-to-noise ratio is further improved by limiter circuit 60 including pentode V17, which removes low frequency noise components appearing as modulations of the I.F. signal. The limiter receives its input through condenser C65 and point X of discriminator transformer T10. Limiting is accomplished by series grid resistor R94 and the low plate and screen voltage from voltage divider R95 and R96. The I.F. waveform is restored by the resonant plate load furnished by transformer T13.

The limiter is transformer-coupled to a second mixer 62 including pentagrid converter tube V13, by means of transformer T13 and signal voltage divider R67 and R68, and the local oscillator cathode follower V12A is capacity-coupled to the second mixer by capacitor C49, and resistors R61 and R62 set the local oscillator signal to the proper value. A 30 kc. low pass filter 64 identical to input filter 34 is used to reject all components of the mixer output except the difference frequency, which is the filtered Doppler signal.

A Doppler output amplifier 66 comprising triode V14A is connected to the output of filter 64. 66 is a conventional R-C amplifier with some negative feedback provided by cathode resistor R74, and is used to raise the level of the filtered Doppler, which is then fed to cathode follower 68 (V18B) for distribution to the output jack J3. If desired, a portion of this output may be distributed to a monitor power amplifier and a loudspeaker (not shown) for monitoring purposes. Control of the level of Doppler output present at J3 is provided by front panel adjustment R79, the Doppler output gain potentiometer.

The bias supply is a conventional voltage doubler operating from the filament supply. Resistor R98 and capacitor C69 constitute a first low-pass filter and the negative bias for constant output amplifier 36 is taken from that point. Further filtering and isolation is provided by resistance R99 and capacitor C70, and resistance R100 reduces the D.C. voltage to allow chassis potentiometer R49, the reactance tube bias control, to operate near the middle of its range.

While the operation of the invention filter device illustrated in Figs. 2 and 3 is believed obvious from the foregoing, a résumé of such operation is set out below.

In the absence of a Doppler signal in the frequency range 1 to 30 kc. at the input filter 34, sweep generator tube V16 of sawtooth generator 52 is biased in a manner such that it conducts and produces a voltage sweep at a predetermined frequency, say about 4 c.p.s. The resulting voltage variations are fed to sweep reactance tube V11 which causes the local oscillator 42 to sweep through a predetermined frequency range, in this case from 130 kc. down to 101 kc. The sweep of the sawtooth generator and local oscillator continues until a Doppler signal having a frequency between 1 and 30 kc. is received by input filter 34 and balanced modulator 40, so that when such signal is mixed in the modulator with the output signal of the local oscillator, an I.F. signal of a preselected value, that is about 100 kc. in the present instance, is obtained.

When an I.F. signal output is developed by the balanced modulator, it is rectified by lock detector 55 and the positive D.C. voltage output thereof is applied to the grid of sweep lock tube 56 (V15B) to cause it to conduct and lower its plate voltage, thus inactivating thyratron V16 and sweep reactance tube V11, and stopping the sweep of the local oscillator. This permits discriminator reactance tube V10 to go into operation to control the oscillator in accordance with the I.F. signal present at the time of inactivation of the thyratron tube. This period of inactivation of the sweep generator continues until such time as the Doppler input signal is lost, as for example by fading, when the generator again goes into operation to repeat the cycle of events described above.

On receiving an I.F. signal, the narrow-band I.F. filter strip 44, having a bandwidth here of about 750 cycles, locks its center frequency to the instantaneous Doppler frequency and moves in synchronism with it. The resulting I.F. signal is transformed into a D.C. voltage by discriminator 48, which is fed to the grid of reactance tube V10 which in turn controls the local oscillator. The I.F. signal output of the I.F. strip is mixed with the local oscillator output in mixer 62 to regain the original Doppler, after passage of the I.F. signal through limiter stage 60, and the mixer output signal is then filtered and amplified to produce a final output Doppler having a greatly improved signal-to-noise ratio and range as compared to the raw Doppler input to the system.

From the foregoing, it is seen that a signal tracking device in the form of a selective filter circuit is provided in accordance with the invention which automatically searches through a predetermined frequency spectrum, locks on any signal encountered within this frequency range, ceases the search operation and then tracks the signal through any frequency changes within the aforementioned range. The invention device substantially increases the signal-to-noise ratio of the input signal and thus extends the range thereof, the system being highly useful for extending the range of a Doppler radar system by improving the signal-to-noise ratio of the Doppler data. The invention circuit is reliable in operation and comparatively simple to construct and operate.

Obviously many modifications and variations of the present invention are possible in the light of the above teachings. It is therefore to be understood that within the scope of the appended claims the invention may be practiced otherwise than as specifically described.

We claim:

1. A selective filter device which comprises a balanced modulator adapted to receive a Doppler signal which is subject to constant variations in frequency within a predetermined range, a local oscillator having its output connected to said modulator, said modulator suppressing the local oscillator content of its output and producing a substantially constant intermediate frequency signal, an intermediate frequency amplifier and narrow band filter connected to the output of said modulator, a discriminator and a first reactance tube connected in series between said amplifier-filter and said local oscillator, the output of said discriminator being applied to control said reactance tube and said reactance tube being direct-coupled to said local oscillator; a circuit connected in parallel between the output of said amplifier and the input of said local oscillator and including a rectifier, a sawtooth voltage generator, said rectifier being arranged to selectively inactivate said saw-tooth voltage generator, and a second reactance tube direct-coupled to said local oscillator, said oscillator having a feedback connection to said saw-tooth voltage generator; a mixer connected across the output of said oscillator and the output of said narrow band filter, and a low pass filter connected to the output of said mixer and arranged to reject all components of the mixer output except the difference frequency between the output of the oscillator and the output of said narrow band filter.

2. A selective filter device for tracking Doppler signals which are subject to constant variations in frequency within a predetermined range which comprises a balanced modulator adapted to receive said Doppler signal, a local oscillator having its output connected to said modulator, said modulator suppressing the local oscillator content of its output and producing a substantially constant intermediate frequency signal, an intermediate frequency amplifier and narrow band filter connected to the output of said modulator, a discriminator and a first reactance tube connected in series between said amplifier-filter and said local oscillator, the output of said discriminator being applied to said reactance tube and said reactance tube being direct-coupled to said local oscillator, a circuit connected in parallel between the output of said amplifier-filter and the input of said local oscillator and including a rectifier and a regulator tube, the output of said rectifier being connected to the grid of said regulator tube, a sawtooth voltage generator containing a thyratron tube and a gas diode, said regulator tube being arranged on the lowering of its plate voltage to extinguish said gas diode and to remove the plate voltage of said thyratron tube to inactivate same, and a second reactance tube having its input connected to the plate of said thyratron and being direct-coupled to said local oscillator, said oscillator having a feedback connection to said saw-tooth voltage generator; a mixer connected across the output of said oscillator and the output of said amplifier-filter, a first noise limiter circuit connected in the input of said sawtooth voltage generator to prevent negative noise spikes in the voltage from said rectifier to cause said sawtooth generator to commence operation, a second limiter circuit connected between said filter and said mixer, said second limiter circuit acting to remove low frequency noise components appearing as modulations of the intermediate frequency, and a low pass filter connected to the output of said mixer and arranged to reject all components of the mixer output except the difference frequency between the output of said oscillator and the output of said amplifier-filter.

3. A Doppler selective filter device which comprises a balanced modulator adapted to receive a Doppler input signal which is subject to constant variations in frequency, a local oscillator having its output connected to said modulator, said modulator suppressing the local oscillator content of its output and producing a substantially constant intermediate frequency signal, an intermediate frequency amplifier and narrow band filter connected to the output of said modulator, a discriminator and a first grid-controlled reactance tube connected in series between said filter and said local oscillator, the output of said discriminator being connected to the grid of said reactance tube and said reactance tube being direct-coupled to said local oscillator, a circuit connected in parallel between the output of said filter and the input of said local oscillator and including a crystal rectifier, a triode, the output of said rectifier being connected to the grid of said triode, a saw-tooth voltage generator containing a gas diode and a thyratron tube having its plate connected to one electrode of said diode, the other electrode of said diode being connected to the plate of said triode so that on the lowering of the plate voltage of said triode said diode will be extinguished thus removing the plate voltage of said thyratron tube to inactivate same, and a second reactance tube having its input connected to the plate of said thyratron and being direct-coupled to said local oscillator, said oscillator having a feedback connection to said thyratron; a mixer connected across the output of said oscillator and the output of said filter, a noise limiter circuit connected between said filter and said mixer, and a low pass filter connected to the output of said mixer and arranged to reject all components of the mixer output except the difference frequency between the output of said oscillator and the output of said filter, whereby in the absence of a Doppler signal at the input to said modulator, said thyratron will conduct and permit said oscillator to sweep through a predetermined frequency spectrum for said signal, and on receipt of a signal such as to generate an intermediate frequency signal at the output of said modulator, positive D.C. voltage will be applied by said rectifier to the grid of said triode to cause it to conduct and lower its plate voltage, thus inactivating said thyratron and said second reactance tube and permitting said first reactance tube to control said oscillator in accordance with the intermediate frequency signal present at the time of inactivation of said thyratron tube.

4. A device as defined in claim 3, including a low pass input filter for receiving said Doppler signal and a constant output amplifier connected to the input of said balanced modulator, the input of said last-mentioned amplifier being connected to the output of said low pass input filter.

References Cited in the file of this patent

UNITED STATES PATENTS

| | | |
|---|---|---|
| 2,283,523 | White | May 19, 1942 |
| 2,470,843 | Boothroyd et al. | May 24, 1949 |
| 2,486,551 | Boothroyd | Nov. 1, 1949 |
| 2,499,514 | Liebscher | Mar. 7, 1950 |
| 2,510,906 | Reid | June 6, 1950 |
| 2,537,596 | Martinelli | Jan. 9, 1951 |
| 2,568,410 | Rambo | Sept. 18, 1951 |
| 2,594,263 | Munster | Apr. 22, 1952 |
| 2,776,425 | Altman | Jan. 1, 1957 |